United States Patent
Michos

(10) Patent No.: US 8,871,820 B2
(45) Date of Patent: Oct. 28, 2014

(54) ALUMINA PARTICLES AND METHODS OF MAKING THE SAME

(75) Inventor: Demetrius Michos, Clarksville, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/554,727

(22) Filed: Sep. 12, 2012

(65) Prior Publication Data

US 2013/0045333 A1   Feb. 21, 2013

Related U.S. Application Data

(62) Division of application No. 12/451,637, filed as application No. PCT/US2008/006564 on May 22, 2008, now abandoned.

(60) Provisional application No. 60/931,242, filed on May 22, 2007.

(51) Int. Cl.
| | | |
|---|---|---|
| C01F 7/00 | (2006.01) | |
| B05D 1/36 | (2006.01) | |
| C01F 7/14 | (2006.01) | |
| B32B 5/16 | (2006.01) | |
| C01F 7/02 | (2006.01) | |

(52) U.S. Cl.
CPC ............... *B05D 1/36* (2013.01); *C01P 2006/22* (2013.01); *C01P 2004/54* (2013.01); *C01P 2004/64* (2013.01); *C01P 2004/62* (2013.01); *C01P 2004/10* (2013.01); *C01F 7/141* (2013.01); *C01P 2006/11* (2013.01); *C01P 2004/04* (2013.01); *B32B 5/16* (2013.01); *C01F 7/02* (2013.01); *C01P 2006/14* (2013.01); *C01P 2002/60* (2013.01)
USPC .............................. 516/94; 516/112; 423/625

(58) Field of Classification Search
USPC .......... 516/94, 112; 423/625–631; 347/73–83
See application file for complete search history.

(56) References Cited

U.S. PATENT DOCUMENTS

| | | | | |
|---|---|---|---|---|
| 4,562,059 A | * | 12/1985 | Asaoka et al. | 423/626 |
| 4,721,696 A | * | 1/1988 | Kidd | 502/210 |
| 6,565,950 B1 | * | 5/2003 | Tomioka et al. | 428/32.34 |
| 2002/0012629 A1 | * | 1/2002 | Yoshino et al. | 423/625 |

FOREIGN PATENT DOCUMENTS

| | | | | |
|---|---|---|---|---|
| EP | 0739857 | | 7/1999 | ............... C01F 7/02 |
| EP | 0849223 | | 5/2000 | ............... C01F 7/02 |
| WO | 2007/070498 | * | 6/2007 | |

OTHER PUBLICATIONS

Preparation of Platelike Nano Alpha Alumina Particles—Ceramics International Elsevier, Amsterdam, NL. vol. 27, No. 3, Jan. 1, 2001.

* cited by examiner

*Primary Examiner* — Steven Bos
(74) *Attorney, Agent, or Firm* — Beverly J. Artale

(57) ABSTRACT

Alumina particles and compositions containing alumina particles are disclosed. Methods of making alumina particles and methods of using alumina particles are also disclosed.

21 Claims, 5 Drawing Sheets

ALUMINA PARTICLES AND METHODS OF MAKING THE SAME

This patent application is a divisional patent application of U.S. Pat. application Ser. No. 12/451,637 entitled "ALUMINA PARTICLES ND METHODS OF MAKING THE SAME" and filed on Mar. 24, 2010, now abandoned, which is a national phase patent application of International Patent Application Serial No. PCT/US2008/006564 entitled "ALUMINA PARTICLES AND METHODS OF MAKING THE SAME" and filed on May 22, 2008, which claims the benefit of priority to U.S. Provisional Patent Application Ser. No. 60/931,242 entitled "ALUMINA PARTICLES AND METHODS OF MAKING THE SAME" and filed on May 22, 2007, the subject matter of each of which is hereby incorporated by reference in its entirety.

FIELD OF THE INVENTION

The present invention is directed to alumina particles, compositions containing alumina particles, methods of making alumina particles, and methods of using alumina particles.

BACKGROUND OF THE INVENTION

There is a need in the art for alumina particles having a relatively small particle size, a high pore volume, and the ability to form stable dispersions having a solution viscosity suitable for many coating processes. There is also a need in the art for compositions containing such alumina particles.

SUMMARY OF THE INVENTION

The present invention addresses some of the difficulties and problems discussed above by the discovery of new alumina particles and compositions containing the alumina particles. The alumina particles have an asymmetrical lath shape that enables the formation of aqueous dispersions having relatively high solids content while maintaining a relatively low viscosity, desirably a viscosity suitable for many coating operations.

In one exemplary embodiment, the alumina particles of the present invention comprise peptized alumina particles having an asymmetric lath particle shape, an average largest particle dimension of less than about 1 micron, a pore volume of at least about 0.40 cc/g, a BET surface area of at least about 150 $m^2$/g, and an aspect ratio at least 1.1. The alumina particles may be used to form an aqueous dispersion comprising up to about 40 wt % of the alumina particles based on a total weight of the dispersion, wherein the dispersion has a pH of less than about 4.0 and a viscosity of less than about 100 cps. The alumina particles may also be used to form coated substrates comprising a substrate having a first surface and a coating of the first surface, wherein the coating comprises the alumina particles.

In a further exemplary embodiment, the alumina particles of the present invention have an asymmetric lath particle shape, and a crystalline structure having a first dimension as measured along a 120 x-ray diffraction plane, and a second dimension as measured along a 020 x-ray diffraction plane, wherein a ratio of the second dimension to the first dimension is at least 1.1.

The present invention is also directed to methods of making alumina particles. In one exemplary method, the method of making alumina particles comprises the steps of (a) adding a first aluminum-containing compound to a first acidic solution until a pH of the first acidic solution is equal to or greater than about 8.0, forming a first basic solution, wherein the pH is increased at a controlled rate of less than about 1.8 pH units/minute; (b) maintaining the pH of the first basic solution for at least about 1.0 minute; (c) adding an acid to the first basic solution until the pH of the first basic solution is equal to or less than about 5.0, forming a second acidic solution; (d) maintaining the pH of the second acidic solution for at least 1.0 minutes; (e) adding a second aluminum-containing compound to the second acidic solution until a pH of the second acidic solution is equal to or greater than about 8.0, forming a second basic solution, wherein the pH is increased at a controlled rate of less than about 1.8 pH units/minute; (f) maintaining the pH of the second basic solution for at least about 1.0 minute; and (g) repeating steps (c) to (f) at least 5 times. In this exemplary method, steps (c) to (f) may be repeated as many times as desired. In some desired embodiments, steps (c) to (f) are repeated up to about 20 times.

In a further exemplary method, the method of making alumina particles comprises the steps of adding only two reactants to water to form a mixture of alumina particles in water, wherein the two reactants comprise sodium aluminate and nitric acid; filtering the mixture at a pH of equal to or greater than about 8.0; washing the alumina particles with deionized water; and drying the alumina particles.

The present invention is further directed to methods of using alumina particles. In one exemplary method of using alumina particles, the method comprises a method of forming a dispersion of alumina particles in water comprising the steps of adding up to 40 wt % alumina particles to water, wherein the weight percent is based on a total weight of the dispersion; and adding an acid to the dispersion in order to decrease the pH of the dispersion to less than about 5.0, typically less than or equal to about 4.0. The resulting dispersion desirably has a viscosity of less than about 100 cps, desirably less than about 80 cps.

In a further exemplary method of using alumina particles, the method comprises a method of forming a coated substrate comprising the steps of providing a substrate having a first surface; coating an aqueous dispersion of alumina particles onto the first surface of the substrate; and drying the coated substrate. The resulting coated substrate is particularly useful as a printable substrate for color-containing compositions such as ink compositions.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to alumina particles and compositions containing alumina particles. The present invention is further directed to methods of making alumina particles, as well as methods of using alumina particles. A description of exemplary alumina particles, compositions containing alumina particles, and methods of making alumina particles and compositions containing alumina particles is provided below.

I. Alumina Particles and Compositions Containing the Same

The alumina particles of the present invention have a physical structure and properties that enable the alumina particles to provide one or more advantages when compared to known alumina particles.

A. Physical Alumina Particle Structure

The alumina particles of the present invention have an asymmetric lath particle shape, unlike known alumina particles having a spherical particle shape. The asymmetric lath particle shape is typically an elongated particle shape having an average largest particle dimension (i.e., a length dimension) that is greater than any other particle dimension (e.g., a cross-sectional dimension substantially perpendicular to the average largest particle dimension). As defined herein "lath" means a shape whose cross-section is rectangular in nature, which may be differentiated with a rod-like or acicular shape that has a symmetrical cross-section. Typically, the alumina particles of the present invention have an average largest particle dimension of less than about 1 micron, more typically, less than about 500 nm, and even more typically, less than 300 nm. In one desired embodiment of the present invention, the alumina particles have an average largest particle dimension of from about 50 to about 600 nm, more desirably, from about 70 to about 150 nm.

Figure 4:
FIG. 4 depicts a transmission electron micrograph (TEM) of a particle according to the present invention.

The alumina particles of the present invention typically have an aspect ratio of at least about 1.1 as measured, for example, using Transmission Electron Microscopy (TEM) techniques. As used herein, the term "aspect ratio" is used to describe the ratio between (i) the average largest particle dimension of the alumina particles and (ii) the average largest cross-sectional particle dimension of the alumina particles, wherein the cross-sectional particle dimension is substantially perpendicular to the largest particle dimension of the alumina particle. The smallest dimension of the particle, the third side of the lath may range from about 3 nm to about 15 nm, typically from about 5 nm to about 12 nm, and more typically from about 6 nm to about 10 nm. In some embodiments of the present invention, the alumina particles have an aspect ratio of at least about 1.1 (or at least about 1.2, or at least about 1.3, or at least about 1.4, or at least about 1.5, or at least about 1.6). Typically, the alumina particles have an aspect ratio of from about 1.1 to about 12, more typically, from about 1.1 to about 3.0. The TEM in FIG. 4 illustrates the lath shape of particles of the present invention as shown by the large width of the particles in comparison to their length.

The alumina particles (both the peptized and unpeptized) of the present invention have a crystalline structure typically with a maximum crystalline dimension of up to about 100 Angstroms as measured using X-ray Diffraction (XRD) techniques, such as using a PANalytical MPD DW3040 PRO Instrument (commercially available from PANalytical B.V. (The Netherlands)) at wavelength equal to 1.54 Angstroms. Crystalline sizes are obtained by using, for example, the Scherrer equation. In one exemplary embodiment of the present invention, the alumina particles of the present invention have a crystalline size of from about 10 to about 50 Angstroms, typically about 30 Angstroms as measured from a 120 XRD reflection, and a crystalline size of from about 30 to about 100 Angstroms, typically about 70 Angstroms as measured from a 020 XRD reflection. The crystalline size ratio of 020 XRD reflection to 120 XRD reflection may range from about 1.1 to about 10.0, and more typically, from about 1.1 to about 3.0.

The peptized alumina particles of the present invention also have a pore volume that makes the alumina particles desirable components in compositions such as coating compositions. Typically, the alumina particles have a pore volume as measured by nitrogen porosimetry of at least about 0.40 cc/g, and more typically, 0.60 cc/g. In one exemplary embodiment of the present invention, the peptized alumina particles have a pore volume as measured by nitrogen porosimetry of at least about 0.70 cc/g. Desirably, the peptized alumina particles have a pore volume as measured by nitrogen porosimetry of from about 0.70 to about 0.85 cc/g.

The alumina particles of the present invention also have a surface area as measured by the BET method (i.e., the Brunauer Emmet Teller method) of at least about 150 $m^2$/g. In one exemplary embodiment of the present invention, the alumina particles have a BET surface area of from about 150 $m^2$/g to about 190 $m^2$/g. In a further exemplary embodiment of the present invention, the alumina particles have a BET surface area of about 172 $m^2$/g.

Pore volume and surface area may be measured using, for example, an Autosorb 6-B unit commercially available from Quantachrome Instruments (Boynton Beach, Fla.). Typically, the pore volume and surface area of alumina powder is measured after drying at about 150° C., and degassing for about 3 hours at 150° C. under vacuum (e.g., 50 millitorr).

B. Properties of the Alumina Particles and Compositions Containing the Same

As a result of the above-described physical properties of the alumina particles of the present invention, the alumina particles are well suited for use in a variety of liquid and solid products. In one exemplary embodiment of the present invention, the peptized alumina particles are used to form a stable dispersion of alumina particles. The dispersion may comprise up to about 40 wt % of the peptized alumina particles of the present invention in water based on a total weight of the dispersion. An acid, such as nitric acid, may be added to the dispersion so as to obtain a dispersion pH of less than about 5.0 (or about 4.5, typically about 4.0, or about 3.5, or about 3.0, or about 2.5, or about 2.0, or about 1.5). The resulting dispersion at 30 wt % solids and a pH of 4.0 desirably has a viscosity of less than about 100 cps, more desirably, less than about 80 cps.

The asymmetrical lath particle shape of the alumina particles of the present invention results in a loosely aggregated system of alumina particles in solution, unlike the tendency of known spherically shaped alumina particles to strongly aggregate with one another. As a result of this loosely aggregated system, a relatively large amount of alumina particles may be present in a given solution while maintaining a relatively low solution viscosity. For example, in one desired embodiment of the present invention, a dispersion containing about 20 wt % of alumina particles based on a total weight of the dispersion at a pH of about 4.0 has a viscosity of less than or about 20 cps. In a further desired embodiment, a dispersion containing about 30 wt % of alumina particles based on a total weight of the dispersion at a pH of about 4.0 has a viscosity of less than or about 80 cps, and a dispersion containing about 40 wt % of alumina particles based on a total weight of the dispersion at a pH of about 4.0 has a viscosity of less than or about 100 cps.

The above-mentioned high solids content, low viscosity dispersions are particularly useful as coating compositions. The dispersions may be used to coat a surface of a variety of substrates including, but not limited to, a paper substrate, a paper substrate having a polyethylene layer thereon, a paper substrate having an ink-receiving layer thereon (e.g., a coating containing a pigment such as amorphous silica and/or a water-soluble binder such as polyvinyl alcohol), a polymeric film substrate, a metal substrate, a ceramic substrate, and combinations thereof. The resulting coated substrate may be used in a number of applications including, but not limited to, printing applications, catalyst applications, etc.

In one exemplary embodiment of the present invention, the coated substrate comprises a printable substrate having a coating layer thereon, wherein the coating layer comprises alumina particles of the present invention. The printable substrate is capable of being used with any printing process, such as an ink jet printing process, wherein a colorant-containing composition (e.g., a dye and/or pigment containing composition) is applied onto an outer surface of the coating layer. In this embodiment, the alumina particles within the coating layer act as wicking agents, absorbing the liquid portion of the colorant-containing composition in a relatively quick manner. An exemplary coated substrate is provided in FIG. 1.

Figure 1:
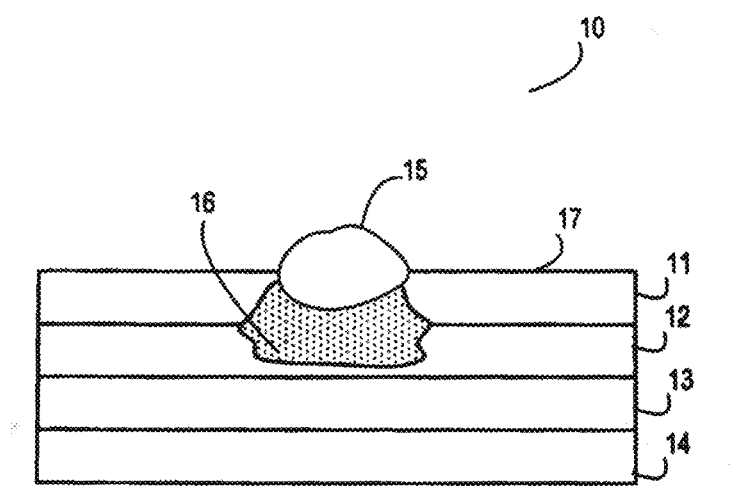
FIG. 1 depicts a cross-sectional view of the exemplary article of the present invention, wherein the exemplary article comprises at least one layer containing alumina particles.

As shown in FIG. 1, exemplary coated substrate 10 comprises coating layer 11, an optional receiving layer 12, an optional support layer 13, and a base layer 14. Coating layer 11 and possibly optional receiving layer 12 comprise alumina particles of the present invention. The remaining layers may also comprise alumina particles of the present invention, although typically optional support layer 13 and base layer 14 do not contain alumina particles. Suitable materials for forming optional receiving layer 12 may include, but are not limited to, water absorptive materials such as polyacrylates; vinyl alcohol/acrylamide copolymers; cellulose polymers; starch polymers; isobutylene/maleic anhydride copolymer; vinyl alcohol/acrylic acid copolymer; polyethylene oxide modified products; dimethyl ammonium polydiallylate; and quaternary ammonium polyacrylate, and the like. Suitable materials for forming optional support layer 13 may include, but are not limited to, polyethylene, polypropylene, polyesters, and other polymeric materials. Suitable materials for forming base layer 14 may include, but are not limited to, paper, fabric, polymeric film or foam, glass, metal foil, ceramic bodies, and combinations thereof.

Exemplary coated substrate 10 shown in FIG. 1 also comprises colorant-containing composition 16 shown within portions of coating layer 11, an optional receiving layer 12. FIG. 1 is utilized to illustrate how colorant-containing composition 16, when applied onto surface 17 of coating layer 11, wicks into coating layer 11 and optional receiving layer 12. As shown in FIG. 1, colorant portion 15 of colorant-containing composition 16 remains within an upper portion of coating layer 11, while the liquid portion of colorant-containing composition 16 extends through coating layer 11 and into optional receiving layer 12.

II. Methods of Making Alumina Particles and Compositions Containing Alumina Particles The present invention is also directed to methods of making alumina particles, as well as compositions containing alumina particles. In one exemplary method, the method of making a alumina particles comprises a pH swing process in which reactants are added to an aqueous solution such as the pH of the solution is adjusted to a pH above about 8.0, and then to a pH of below about 5.0, and then back to a pH above about 8.0, and so on for a desired number of pH swing cycles. Such a process may be described with reference to FIGS. 2A-2B.

Figure 2A:
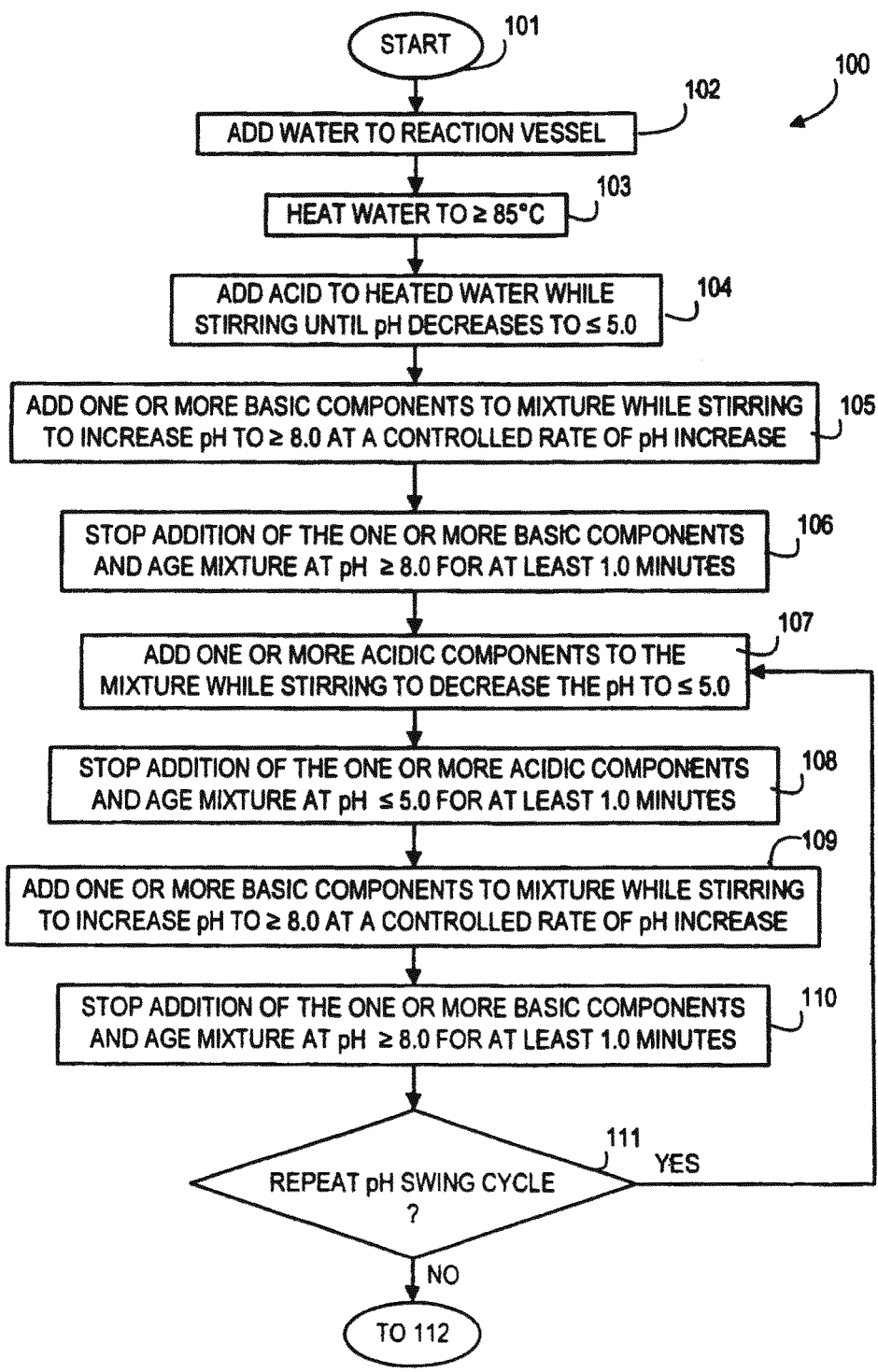
FIGS. 2A-2B depict a flow diagram of an exemplary method of making alumina particles of the present invention.
Figure 2B:
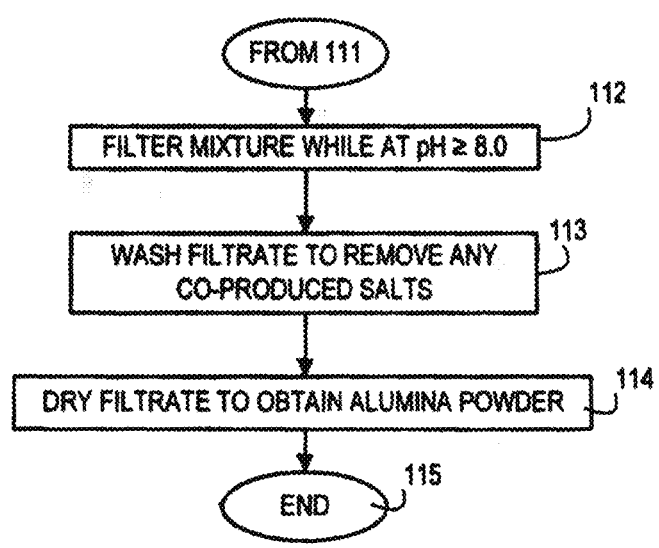

As shown in FIG. 2A, exemplary method 100 starts at block 101, and proceed to step 102, wherein water is added to a reaction vessel. From step 102, exemplary method 100 proceeds to step 103, wherein the water is heated to a temperature equal to or greater than about 85° C. Typically, the water is heated to a temperature of about 85° C. (or about 90° C., or about 95° C.). From step 103, exemplary method 100 proceeds to step 104, wherein one or more acidic components are added to the heated water while stirring until the pH of the mixture is equal to or less than about 5.0. Typically, the pH of the mixture is decrease to a pH of about 5.0 (or about 4.5, or about 4.0, or about 3.5, or about 3.0, or about 2.5, or about 2.0, or about 1.5).

In step 104, the one or more acidic components added to the mixture may comprise one or more acidic components including, but not limited to, nitric acid, sulphuric acid, hydrochloric acid, aluminum nitrate, aluminum chlorohydrol, aluminum sulphate, or combinations thereof. In one desired embodiment, the one or more acidic components comprise nitric acid.

From step 104, exemplary method 100 proceeds to step 105, wherein one or more basic components are added to the mixture while stirring to increase the pH of the mixture to a pH equal to or greater than about 8.0. Typically, the pH of the mixture at this step is increased to a pH of about 8.0 (or about 8.5, or about 9.0, or about 9.5, or about 10.0, or about 10.5, or about 11.0, or about 11.5). In step 105, it is desirable for the pH of the mixture to increase at a controlled rate of less than about 1.8 pH units/minute. Such a controlled rate of pH increase has been found to produce alumina particles having a desired shape and pore volume. Typically, the controlled rate of pH increase is about 1.8 pH units/minute (or about 1.7 pH units/minute, or about 1.6 pH units/minute, or about 1.5 pH units/minute, or about 1.4 pH units/minute).

In step 105, the one or more basic components added to the mixture may comprise one or more basic components including, but not limited to, sodium hydroxide, ammonia, sodium aluminate, aluminum hydroxide, or combinations thereof. In one desired embodiment, the one or more basic components comprise sodium aluminate.

From step 105, exemplary method 100 proceeds to step 106, wherein the addition of the one or more basic components to the mixture is stopped, and the mixture having a pH equal to or greater than about 8.0 (or about 8.5, or about 9.0, or about 9.5, or about 10.0, or about 10.5, or about 11.0, or about 11.5) is allowed to age for at least 1.0 minute while stirring. In this step, the mixture is typically allowed to age for about 1.0 minute, but can be aged at any given length of time (e.g., from about 1.0 minutes to about 10 minutes and any length therebetween). After aging for at least 1.0 minute in step 106, exemplary method 100 proceeds to step 107, wherein the one or more acidic components are added to the mixture while stirring until the pH of the mixture is equal to or less than about 5.0. Typically, the pH of the mixture at this step is decreased to a pH of about 5.0 (or about 4.5, or about 4.0, or about 3.5, or about 3.0, or about 2.5, or about 2.0, or about 1.5).

As in step 104 described above, in step 107, any of the above-mentioned acidic components may be used to decrease the pH of the mixture. In one desired embodiment, the one or more acidic components used in step 107 comprise nitric acid. In step 107, one or more acidic components may be added to the mixture at a controlled rate to decrease the pH of the mixture within a desired amount of time. In one exemplary embodiment, the pH is lowered at a controlled rate of about 8.0 pH units/minute. In other embodiments, the pH may be lowered at a controlled rate of about 7.0 pH units/minute (or about 6.0 pH units/minute, or about 5.0 pH units/minute, or about 4.0 pH units/minute, or about 9.0 pH units/minute).

From step 107, exemplary method 100 proceeds to step 108, wherein the addition of the one or more acidic components to the mixture is stopped, and the mixture having a pH equal to or less than about 5.0 (or about 4.5, or about 4.0, or about 3.5, or about 3.0, or about 2.5, or about 2.0, or about 1.5) is allowed to age for at least 1.0 minute while stirring. In this step, the mixture is typically allowed to age for about 3.0 minutes, but can be aged at any given length of time (e.g., from about 1.0 minutes to about 10 minutes and any length therebetween). After aging for at least 1.0 minute in step 108, exemplary method 100 proceeds to step 109, wherein one or more basic components are added to the mixture while stirring to increase the pH of the mixture to a pH equal to or greater than about 8.0 (or about 8.5, or about 9.0, or about 9.5, or about 10.0, or about 10.5, or about 11.0, or about 11.5). In step 109, it is desirable for the pH of the mixture to increase at a controlled rate of less than about 1.8 pH units/minute. Typically, the controlled rate of pH increase in step 109 is about 1.8 pH units/minute (or about 1.7 pH units/minute, or about 1.6 pH units/minute, or about 1.5 pH units/minute, or about 1.4 pH units/minute).

In step 109, the one or more basic components added to the mixture may be any of the above-mentioned basic components. In one desired embodiment, the one or more basic components used in step 109 comprise sodium aluminate.

From step 109, exemplary method 100 proceeds to step 110, wherein the addition of the one or more basic components to the mixture is stopped, and the mixture having a pH equal to or greater than about 8.0 (or about 8.5, or about 9.0, or about 9.5, or about 10.0, or about 10.5, or about 11.0, or about 11.5) is allowed to age for at least 1.0 minute while stirring. In this step, the mixture is typically allowed to age for about 1.0 minute, but can be aged at any given length of time (e.g., from about 1.0 minutes to about 10 minutes and any length therebetween).

After aging for at least 1.0 minute in step 110, exemplary method 100 proceeds to decision block 111, wherein a determination is made by a manufacturer whether to repeat the above-described pH swing cycle. If a determination is made at decision block 111 to repeat the above-described pH swing cycle, exemplary method 100 returns to step 107 and proceeds as described above. Typically, exemplary method 100 returns to step 107 and repeats the above-described pH swing cycle for a total of at least 5 pH swing cycles. In some desired embodiments of the present invention, exemplary method 100 comprises a total of about 5 pH swing cycles (or about 5 pH swing cycles, or about 10 pH swing cycles, or about 20 pH swing cycles, or more than about 20 pH swing cycles).

If at decision block 111 a determination is made not to repeat the above-described pH swing cycle, exemplary method 100 proceeds to step 112 (shown in FIG. 2B), wherein the mixture is filtered while the pH of the mixture is equal to or greater than about 8.0 (or about 8.5, or about 9.0, or about 9.5, or about 10.0, or about 10.5, or about 11.0, or about 11.5). From step 112, exemplary method 100 proceeds to step 113, wherein the filtrate is washed with deionized water to remove any co-produced salts. In an alternative embodiment, a dilute ammonia solution or ammonium carbonate solution may be used to wash the filtrate. Typically, the filtrate is washed for about 5.0 minutes, but any length of wash time may be used.

From step 113, exemplary method 100 proceeds to step 114, wherein the washed filtrate is dried to obtain alumina powder. From step 114, exemplary method 100 proceeds to end block 115, where exemplary method 100 ends.

In a first desired embodiment of the present invention, the method of making alumina particles comprises the steps of (a) adding a first aluminum-containing compound to a first acidic solution until a pH of the first acidic solution is equal to or greater than about 8.0 (or about 8.5, or about 9.0, or about 9.5, or about 10.0, or about 10.5, or about 11.0, or about 11.5), forming a first basic solution, wherein the pH is increased at a controlled rate of less than about 1.8 pH units/minute; (b) maintaining the pH of the first basic solution for at least about 1.0 minute; (c) adding an acid to the first basic solution until the pH of the first basic solution is equal to or less than about 5.0 (or about 4.5, or about 4.0, or about 3.5, or about 3.0, or about 2.5, or about 2.0, or about 1.5), forming a second acidic solution; (d) maintaining the pH of the second acidic solution for at least 1.0 minutes; (e) adding a second aluminum-containing compound to the second acidic solution until a pH of the second acidic solution is equal to or greater than about 8.0 (or about 8.5, or about 9.0, or about 9.5, or about 10.0, or about 10.5, or about 11.0, or about 11.5), forming a second basic solution, wherein the pH is increased at a controlled rate of less than about 1.8 pH units/minute; (f) maintaining the pH of the second basic solution for at least about 1.0 minute; and (g) repeating steps (c) to (f) at least 5 times. In this first desired embodiment, the first aluminum-containing compound and the second aluminum-containing compound comprise sodium aluminate, and the acid comprises nitric acid.

In the above-described pH swing cycle, it is desirable in some embodiments for the second acidic solution to have a pH of from about 1.4 to about 3.0 (e.g., in steps (c) and (d)), and the second basic solution to have a pH of from about 9.0 to about 10.6 (e.g., in steps (e) and (f)). In one desired embodiment, the second acidic solution has a pH of about 1.6, and the second basic solution has a pH of about 10.2. Further, in the above-described pH swing cycle, it is desirable in some embodiments for the controlled rate of pH increase to be about 1.7 pH units/minute (e.g., in steps (a) and (e)).

In the above-described pH swing cycle, it is desirable in some embodiments for the pH of the second acidic solution to be maintained (i.e., "aged") at a pH equal to or less than about 5.0 for about 2 to about 5 minutes in step (d), and the pH of the second basic solution to be maintained (i.e., "aged") at a pH equal to or greater than about 8.0 for about 1 to about 3 minutes in step (f). In one desired embodiment, the pH of the second acidic solution is maintained at a pH equal to or less than about 5.0 (or about 4.5, or about 4.0, or about 3.5, or about 3.0, or about 2.5, or about 2.0, or about 1.5) for about 3 minutes in step (d), and the pH of the second basic solution is maintained at a pH equal to or greater than about 8.0 (or about 8.5, or about 9.0, or about 9.5, or about 10.0, or about 10.5, or about 11.0, or about 11.5) for about 1 minute in step (f).

Although not critical to the present invention, in some embodiments of the present invention, the acid added to the first basic solution in step (c) may be added so as to decrease the pH at a controlled rate of about 8.0 pH units/minute.

In a second desired embodiment of the present invention, the method of making alumina particles comprises a method wherein sodium aluminate and nitric acid are the only reactants used to form the alumina particles. In this desired embodiment, the method of making alumina particles comprises the steps of adding only two reactants to water to form a mixture of alumina particles in water, wherein the two reactants comprise sodium aluminate and nitric acid. The reactants may be added using the following exemplary steps:

(a) adding sodium aluminate to a first acidic solution until a pH of the first acidic solution is equal to or greater than about 8.0 (or about 8.5, or about 9.0, or about 9.5, or about 10.0, or about 10.5, or about 11.0, or about 11.5), forming a first basic solution, wherein the first acidic solution comprises nitric acid in water; (b) maintaining the pH of the first basic solution for at least 1 minute; (c) adding nitric acid to the first basic solution until the pH of the first basic solution is equal to or less than about 5.0 (or about 4.5, or about 4.0, or about 3.5, or about 3.0, or about 2.5, or about 2.0, or about 1.5), forming a second acidic solution; (d) maintaining the pH of the second acidic solution for at least 3.0 minutes; (e) adding sodium aluminate to the second acidic solution until a pH of the second acidic solution is equal to or greater than about 8.0 (or about 8.5, or about 9.0, or about 9.5, or about 10.0, or about 10.5, or about 11.0, or about 11.5), forming a second basic solution; (f) maintaining the pH of the second basic solution for at least 1 minute; and (g) repeating steps (c) to (f) at least 5 times. Desirably, sodium aluminate is added to the first acidic solution in step (a) and the second acidic solution in step (e) so as to increase the pH at a controlled rate of about 1.7 pH units/minute.

In either of the above-described first and second desired methods of making alumina particles, the methods may further comprise the steps of filtering the mixture at a pH of equal to or greater than about 8.0 (or about 8.5, or about 9.0, or about 9.5, or about 10.0, or about 10.5, or about 11.0, or about 11.5); washing the alumina particles with deionized water; and drying the alumina particles.

In some embodiments of the present invention, the alumina powder formed in the above-described methods, including exemplary method 100, may be used as alumina powder in a variety of applications without further processing. Suitable applications include, but are not limited to, as a catalyst support for use in hydroprocessing applications, and fluid catalytic cracking (FCC) applications; as a binder for use in catalysts, ceramics, etc.; as a filler for use in polymeric products; as a pigment for use in paints, powder coatings, UV cured coatings, protective coatings, etc.; as a desiccant for use in moisture free environment; as a toner component for photocopying applications; etc. In other embodiments, the alumina powder formed in the above-described methods, including exemplary method 100, may be further processed and used to form a variety of solid and/or liquid products. For example, the alumina powder formed in exemplary method 100 may be used to form an alumina sol, an ink jet ink composition, a coating for a substrate such as a printable substrate (i.e., a substrate on which may be applied a color-containing composition). In one exemplary embodiment of the present invention, the alumina powder formed in exemplary method 100 is used to form an alumina sol. An exemplary method for making an alumina sol is provided in FIG. 3.

Figure 3:
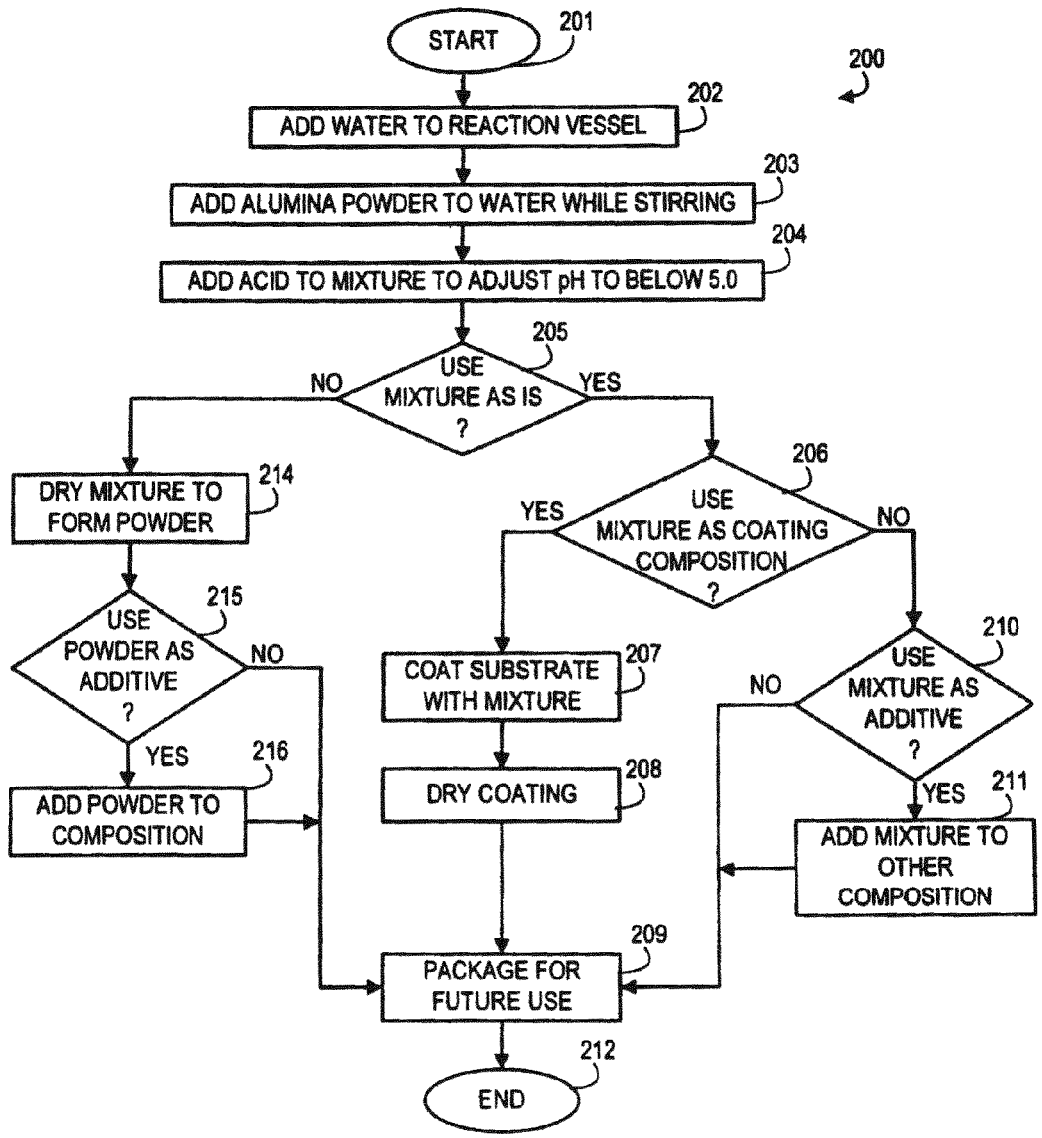
FIG. 3 depicts a flow diagram of an exemplary method of making an alumina sol of the present invention.

As shown in FIG. 3, exemplary method 200 starts at block 201, and proceed to step 202, wherein water is added to a reaction vessel. From step 202, exemplary method 200 proceeds to step 203, wherein alumina powder (or particles) are added to the water while stirring. The amount of alumina powder added to the water may vary depending of the end use of the resulting alumina sol. Typically, alumina powder is added so as to produce a solids content of up to about 40 wt % alumina based on a total weight of the alumina sol.

From step 203, exemplary method 200 proceeds to a peptizing step 204, wherein an acid is added to the mixture while stirring until the pH of the mixture is equal to or less than about 5.0. Typically, the pH of the mixture is decreased to a pH of about 5.0 (or about 4.5, more typically about 4.0, or about 3.5, or about 3.0, or about 2.5, or about 2.0, or about 1.5). In step 204, the acid added to the mixture may comprise one or more acids including, but not limited to, nitric acid, sulphuric acid, carboxylic acid, or combinations thereof. In one desired embodiment, the acid used in step 204 comprises nitric acid. These particles are herein defined as "peptized".

From step 204, exemplary method 200 proceeds to decision block 205, wherein a determination is made by a manufacturer whether to use the resulting mixture as is or to continue with further processing. If a determination is made at decision block 205 to use the resulting mixture as is, exemplary method 200 proceeds to decision block 206, wherein a determination is made by a user whether to use the mixture as a coating composition.

If at decision block 206 a determination is made to use the mixture as a coating composition, exemplary method 200 proceeds to step 207, wherein the mixture is coated onto a surface of a substrate. Although not shown in exemplary method 200, prior to coating the mixture onto the substrate in step 207, one or more additional components may be added to the coating composition. Suitable additional components may include, but are not limited to, one or more colorants (e.g., dyes, pigments, etc.), one or more surfactants, one or more fillers, or any combination thereof.

From step 207, exemplary method 200 proceeds to step 208, wherein the coating composition on the substrate is dried to produce a coated substrate. Typically, the coating composition is dried at a drying temperature ranging from about 100° C. to about 150° C. depending on a number of factors including, but not limited to, the type of substrate, the type of process (e.g., batch versus continuous), etc. From step 208, exemplary method 200 proceeds to an optional step 209, wherein the coated substrate is packaged and stored for future use. In an alternative embodiment, the coated substrate may be used immediately without the need for packaging (e.g., an in-line printing process where a print coating is applied over the alumina particle containing coating). From step 209, exemplary method 200 proceeds to step 212, where exemplary method 200 ends.

Returning to decision block 206, if a determination is made to not use the mixture as a coating composition, exemplary method 200 proceeds to decision block 210, where a determination is made whether to use the mixture as an additive in another composition (e.g., an ink jet ink composition). If at decision block 210 a determination is made to use the mixture as an additive in another composition, exemplary method 200 proceeds to step 211, wherein the mixture is added to another composition.

From step 211, exemplary method 200 proceeds to optional step 209 described above, wherein the resulting composition containing the alumina sol as an additive is packaged and stored for future use. In an alternative embodiment, the resulting composition containing the alumina sol as an additive may be used immediately without the need for packaging (e.g., as a coating composition in an in-line coating process). From step 209, exemplary method 200 proceeds to step 212, where exemplary method 200 ends.

Returning to decision block 205, if a determination is made to not use the resulting mixture as is, exemplary method 200 proceeds to step 214, wherein the mixture is dried to form an alumina powder. Typically, the mixture is dried at a drying temperature ranging from about 100° C. to about 150° C. depending on a number of factors including, but not limited to, the desired rate of drying, the type of process (e.g., batch versus continuous), etc. From step 214, exemplary method 200 proceeds to decision block 215.

At decision block 215, a determination is made by a user whether to use the resulting alumina powder as an additive in another composition. If a determination is made to use the resulting alumina powder as an additive in another composition, exemplary method 200 proceeds to step 216, wherein the resulting alumina powder is added to another composition. From step 216, exemplary method 200 proceeds to optional step 209 described above, wherein the resulting composition containing the alumina powder as an additive is packaged and stored for future use. In an alternative embodiment, the resulting composition containing the alumina powder as an additive may be used immediately without the need for packaging (e.g., as a coating composition in an in-line coating process). From step 209, exemplary method 200 proceeds to step 212, where exemplary method 200 ends.

Returning to decision block 215, if a determination is made to not use the resulting alumina powder as an additive in another composition, exemplary method 200 proceeds directly to optional step 209 described above, wherein the resulting alumina powder is packaged and stored for future use. In an alternative embodiment, the resulting alumina powder may be used immediately without the need for packaging (e.g., as a dry coating in an in-line coating process). From step 209, exemplary method 200 proceeds to step 212, where exemplary method 200 ends.

III. Methods of Using Alumina Particles

The present invention is further directed to methods of using alumina particles and compositions containing alumina particles to form a number of solid and liquid products. As discussed above, the alumina particles may be used in a method of making an alumina sol. In one exemplary method, the method of making an alumina sol comprises the steps of adding alumina particles to an aqueous solution to form a mixture; and adjusting a pH of the mixture to less than about 5.0, typically less than or equal to about 4.0. Desirably, the resulting alumina sol has a solids content of alumina particles of up to about 40 wt % based on a total weight of the alumina sol, a pH of about 4.0, and a viscosity of less than about 100 cps. In one exemplary embodiment, the resulting alumina sol has a solids content of alumina particles of about 30 wt % based on a total weight of the alumina sol, a pH of about 4.0, and a viscosity of less than about 80 cps.

In a further exemplary embodiment of the present invention, the alumina particles may be used in a method of making a coated substrate. In one exemplary method, the method of making a coated substrate comprises the steps of providing a substrate having a first surface; and coating an alumina sol onto the first surface of the substrate forming a coating layer thereon. The coating layer may be subsequently dried to form a coated substrate. The coated substrate may be used to form a printed substrate. In one exemplary method of the present invention, a method of forming a printed substrate comprises the steps of applying a color-containing composition onto the coating layer of the coated substrate described above.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Preparation of Alumina Particles 11.4 kg of water was added to a vessel, which was then heated to 95° C. Into the water was added 40 wt % nitric acid while stirring until the pH reached 2.0. Sodium aluminate (23 wt % $Al_2O_3$) was then added at a controlled rate so that the pH of the mixture reached 10.0 in 5 minutes. Once a pH of 10.0 was reached, the addition of sodium aluminate was stopped and the mixture was aged for 1 minute. After aging, 40 wt % nitric acid was added to the reaction vessel at a rate so that the pH of the mixture reached 2.0 in 1 minute. Once a pH of 2.0 was reached, the addition of nitric acid was stopped and the mixture was aged for 3 minutes. At the end of this aging period, sodium aluminate was added again to the reaction vessel in order to increase the pH from 2.0 to 10.0 in 5 minutes.

The above pH cycling steps were repeated for a total of 20 times. At the end of the $20^{th}$ cycle and while the pH of the mixture was 10.0, the mixture was filtered to recover the formed alumina, and then washed in order to remove any co-produced salts. The filter cake obtained was then spray dried to obtain alumina powder.

The crystallite size of the alumina powder was measured using X-ray Diffraction (XRD) techniques. The alumina powder had a crystallite size of 30 Angstroms as measured from the [120] XRD reflection, and 70 Angstroms as measured from the [020] XRD reflection.

EXAMPLE 2

Preparation of an Alumina Sol

The alumina powder formed in Example 1 above was dispersed in water to form a mixture, and then the pH of the mixture was adjusting to about 4.0 with nitric acid while stirring. The resulting mixture contained a dispersion of particles having an average particle size of 123 nm as measured using a LA-900 laser scattering particle size distribution analyzer commercially available from Horiba Instruments, Inc. (Irvine, Calif.). The resulting mixture had a viscosity of 80 cps and a solids content of 30 wt % based on a total weight of the mixture.

Drying the mixture at 150° C. resulted in alumina powder having a BET surface area of 172 $m^2/g$ and a pore volume of 0.73 cc/g as measured using nitrogen porosimetry.

EXAMPLE 3

Preparation of a Coated Substrate

Various substrates were coated using the alumina sol formed in Example 2. Substrates included a paper substrate, a paper substrate having a polyethylene layer thereon, and a paper substrate having a receiving layer thereon (e.g., a coating containing amorphous silica and a water-soluble binder in the form of polyvinyl alcohol). The alumina sol was coated onto each of the substrates using a knife coating process so as to provide a coating layer having a coating weight ranging from about 18 to about 20 $g/m^2$. The coated substrates were dried at 150° C.

Ink compositions were applied onto each of the coated substrates. In all cases, the ink compositions quickly penetrated the alumina particle coating.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An alumina sol or dispersion comprising alumina particles having an asymmetric lath particle shape, an average largest particle dimension of less than about 1 micron, an aspect ratio at least 1.1, a first crystalline dimension as measured in Angstroms along a 120 x-ray diffraction plane, and a second crystalline dimension as measured in Angstroms along a 020 x-ray diffraction plane, wherein a ratio of said second crystalline dimension to said first crystalline dimension is from about 1.1 to about 10.0.

2. The alumina sol or dispersion of claim 1, wherein the particles have an average largest particle dimension of from about 80 to about 600 nm.

3. The alumina sol or dispersion of claim 1, wherein the particles have an average largest particle dimension of from about 100 to about 150 nm.

4. The alumina sol or dispersion of claim 1, wherein the particles have a pore volume of at least about 0.40 cc/g.

5. The alumina sol or dispersion of claim 1, wherein the particles have a pore volume of from about 0.50 to about 0.85 cc/g.

6. The alumina sol or dispersion of claim 1, wherein the particles have a BET surface area of about 172 $m^2/g$.

7. The alumina sol or dispersion of claim 1, wherein said first crystalline dimension ranges from about 10 to about 50 Angstroms, and said second crystalline dimension ranges from about 30 to about 100 Angstroms.

8. The dispersion of claim 1, wherein said dispersion comprises up to about 40 wt % of said alumina particles in water based on a total weight of said dispersion, wherein said dispersion has a pH of less than about 4.0 and a viscosity of less than about 100 cps.

9. The dispersion of claim 1, wherein said dispersion comprises about 30 wt % of said alumina particles based on a total weight of said dispersion, wherein said dispersion has a pH of about 4.0 and a viscosity of about 80 cps.

10. The alumina sol or dispersion of claim 1, wherein said alumina particles have an aspect ratio of from about 1.1 to about 12, and a smallest particle size dimension ranging from about 3 nm to about 15 nm.

11. The alumina sol or dispersion of claim 7, wherein the ratio of said second crystalline dimension to said first crystalline dimension is from about 1.1 to about 3.0.

12. An alumina dispersion comprising alumina particles having an asymmetric lath particle shape, an average largest particle dimension of less than about 1 micron, an aspect ratio at least 1.1, a first crystalline dimension of about 10 to about 50 Angstroms as measured along a 120 x-ray diffraction plane, and a second crystalline dimension of about 30 to about 100 Angstroms as measured along a 020 x-ray diffraction plane, wherein said dispersion comprises up to about 40 wt % of the alumina particles in water based on a total weight of said dispersion, and wherein said dispersion has a pH of less than about 4.0 and a viscosity of less than about 100 cps.

13. The dispersion of claim 12, wherein said dispersion comprises about 30 wt % of said alumina particles based on a total weight of said dispersion, wherein said dispersion has a viscosity of about 80 cps.

14. The alumina sol or dispersion of claim 12, wherein a ratio of said second crystalline dimension to said first crystalline dimension is from about 1.1 to about 10.0.

15. The alumina sol or dispersion of claim 14, wherein a ratio of said second crystalline dimension to said first crystalline dimension is from about 1.1 to about 3.0.

16. An alumina sol or dispersion comprising alumina particles having an asymmetric lath particle shape, an average largest particle dimension of less than about 1 micron, an aspect ratio at least 1.1, a pore volume of from about 0.50 to about 0.85 cc/g, a BET surface area of from about 150 to about 190 $m^2/g$, a first crystalline dimension of about 10 to about 50 Angstroms as measured along a 120 x-ray diffraction plane, and a second crystalline dimension of about 30 to about 100 Angstroms as measured along a 020 x-ray diffraction plane.

17. The alumina sol or dispersion of claim 16, wherein the particles have an average largest particle dimension of from about 80 to about 600 nm.

18. The alumina sol or dispersion of claim 17, wherein the particles have an average largest particle dimension of from about 100 to about 150 nm.

19. The alumina sol or dispersion of claim 16, wherein said dispersion comprises up to about 40 wt % of said alumina particles based on a total weight of said sol or dispersion, wherein said dispersion has a pH of less than about 4.0, and has a viscosity of less than about 100 cps.

20. The alumina sol or dispersion of claim 16, wherein a ratio of said second crystalline dimension to said first crystalline dimension is from about 1.1 to about 10.0.

21. The alumina sol or dispersion of claim 20, wherein a ratio of said second crystalline dimension to said first crystalline dimension is from about 1.1 to about 3.0.

* * * * *